United States Patent
Lee

(10) Patent No.: US 6,222,989 B1
(45) Date of Patent: Apr. 24, 2001

(54) FUMIGATION TYPE CONTROL DEVICE FOR SCATTERING AGRICULTURAL CHEMICALS

(76) Inventor: Kyong Woo Lee, #101-304, Shiyoung Apt. 17-3, Shincheon-dong, Songpa-ku, Seoul (KR)

(*) Notice: Subject to any disclaimer, the term of this patent is extended or adjusted under 35 U.S.C. 154(b) by 0 days.

(21) Appl. No.: 09/431,859

(22) Filed: Nov. 2, 1999

Related U.S. Application Data

(63) Continuation of application No. 08/961,406, filed on Oct. 30, 1997, now abandoned.

(30) Foreign Application Priority Data

Oct. 31, 1996 (KR) .................................................. 96-51421

(51) Int. Cl.[7] .............................. A61M 16/00; H05B 3/02
(52) U.S. Cl. ............................................ 392/390; 219/538
(58) Field of Search ...................................... 392/386, 390, 392/391; 219/465.1, 467.1, 538, 539, 544, 546, 490, 497

(56) References Cited

U.S. PATENT DOCUMENTS

| | | | |
|---|---|---|---|
| 3,375,774 | 4/1968 | Fujimura et al. ...................... 99/281 |
| 3,400,252 | 9/1968 | Hayakawa et al. ................... 219/504 |
| 3,584,196 | 6/1971 | Kurokawa ............................ 219/435 |
| 3,679,871 | * 7/1972 | Evalds ................................. 219/499 |
| 4,163,038 | 7/1979 | Nishimura et al. ..................... 422/36 |
| 4,228,124 | 10/1980 | Kashihara et al. ..................... 422/36 |
| 4,675,504 | 6/1987 | Suhajda ............................... 392/390 |
| 4,731,522 | 3/1988 | Manchester .......................... 219/275 |
| 4,758,708 | 7/1988 | Manchester .......................... 219/272 |
| 4,759,189 | 7/1988 | Stropkay et al. ....................... 60/531 |
| 5,148,005 | 9/1992 | Fang et al. ........................... 219/505 |
| 5,532,461 | 7/1996 | Crummenauer et al. ............ 219/621 |

OTHER PUBLICATIONS

Kenneth A. Hassall, "The Biochemistry of uses of Pesticides," Second Edition 1990.

* cited by examiner

*Primary Examiner*—Sang Paik
(74) *Attorney, Agent, or Firm*—Lee & Hong

(57) ABSTRACT

A fumigation type control device for scattering agricultural chemicals, capable of heating and fumigating the agricultural chemicals while maintaining a proper desired temperature. The control device requires no separate temperature adjustor, and a plurality of the control devices can be simultaneously operated by limiting an excessive starting current flowing therethrough. The control device includes a first heating element having a constant resistance value regardless of variation of its temperature which generates heat in response to a current flowing therethrough at an initial power-on stage, a second heating element for generating heat connected in series to the first heating element and having a resistance value which increases in accordance with increases in its temperature, and a storage tank for storing the agricultural chemicals to be fumigated and heating the stored agricultural chemicals in response to heat generated from the first and second heating elements. The second heating element has a positive temperature characteristic, and if the heating temperature of the agricultural chemicals varies due to the variation of the environmental temperature of the supply voltage, or the generation of the heat loss, the resistance value of the second heating element varies to limit the current flowing therethrough, so that the temperature is kept uniform.

17 Claims, 6 Drawing Sheets

FUMIGATION TYPE CONTROL DEVICE FOR SCATTERING AGRICULTURAL CHEMICALS

This application is a continuation in part of Ser. No. 08/961,406, filed Oct. 30, 1997, abandoned.

BACKGROUND OF THE INVENTION

1. Field of the Invention

The present invention relates to a control device for scattering agricultural chemicals by fumigation especially in a hothouse such as a vinyl plastic hothouse for cultivating crops. In particular, the present invention relates to a fumigation type control device for scattering agricultural chemicals which can keep the temperature of the agricultural chemicals uniform when fumigating and scattering the agricultural chemicals by heating them, and whereby a plurality of control devices can be simultaneously operated to prevent the excessive flow of starting current at an initial power-on stage.

2. Description of the Prior Art

The control device for scattering the agricultural chemicals for destroying germs may be classified into a spray type and a fumigation type. The spray type control device is used for scattering the agricultural chemicals diluted with a large quantity of water utilizing a sprayer. However, the spray type control device is generally used in scattering the agricultural chemicals onto the crops cultivated on the exposed land, but is improper for use in scattering the agricultural chemicals onto the crops cultivated within an airtight space such as a hothouse.

The fumigation type control device is used for evaporating the agricultural chemicals by heating them and scattering the evaporated chemicals onto the crops. The fumigation type control device has a superior insecticidal effect since the evaporated chemicals act on the germs as minute particles, and can be implemented by a simple device. Also, since the fumigation type control device enables the scattering to be performed at night when farmers do not work, it has been mainly used for scattering in an airtight space such as a vinyl plastic hothouse, a greenhouse, and the like.

The fumigation type control device may also be classified into one using an electric lamp as its heating element, and the other using a nichrome wire as its heating element. The electric lamp, which radiates light and heat when it is turned on, heats and fumigates the agricultural chemicals. However, the electric lamp suffers from a large power consumption due to the radiation of light. Particularly, the electric lamp consumes more than 100 W in power, whereas the other fumigation type control device typically requires only about 35 W. Further, the electric lamp has no function for adjusting the temperature of the agricultural chemicals, and thus the temperature range of the heated chemicals greatly varies according to the room temperature of the hothouse and the variation of the voltage supplied to the electric lamp. As a result, the fumigation type control device using the electric lamp as its heating element may be used without a problem in regions where the quality of the electric power is good and the temperature variation in the hothouse is small, but it cannot be suitably used otherwise.

A fumigation type control device for heating and evaporating the agricultural chemical using a nichrome wire as its heating element is disclosed in Korean Utility Model Laid-open No. 95-29140. FIG. 1 illustrates the fumigation type control device disclosed in Korean Utility Model Laid-open No. 95-29140.

Referring to FIG. 1, a plurality of coupling rods 3, which are fixed along the outer periphery of a main body 1 of the control device, are coupled to a coupling bracket 5. On the center of the coupling bracket 5 is provided a link 7. In FIGS. 1–2, the reference numeral 9 denotes a storage tank for storing agricultural chemicals to be fumigated, and reference numeral 11 denotes a protective barrel installed inside the main body I to protect the storage tank 9.

On the bottom surface of the protective barrel 11, a heating element 13 is provided which is a nichrome wire for heating the agricultural chemicals in the storage tank 9 by generating heat when the power is supplied thereto. Also, on the outer surface of the main body 1 are provided a temperature adjustor 15 for manually controlling the heating temperature of the heating element 13 and a power switch for switching the power supply to the heating element 13.

The operation of the conventional fumigation type control device as constructed above will be explained. The link 7 of the control device is suspended in a predetermined position so that the control device is maintained in horizontal orientation. If the power switch 17 is turned on, power is supplied to the heating element 13, causing the heating element 13 to generate heat. Accordingly, the agricultural chemicals stored in the storage tank 9 are heated and evaporated, and then the evaporated agricultural chemicals are scattered onto the cultivated crops to destroy germs.

At this time, a user manipulates the temperature adjustor 15 for controlling the power supply to the heating element 13, so that the agricultural chemicals are heated and evaporated at a proper temperature.

According to the conventional control device as described above, it is difficult to heat the agricultural chemicals to a proper desired temperature due to the voltage variation of the supplied power, the variation of the environmental temperature, and the variation of the temperature adjustor 15 itself. Further, the contacts of the temperature adjustor 15 are apt to corrode by highly corrosive gases produced during fumigation of the agricultural chemicals in the hothouse, the high temperature and high humidity environment, and various harmful gases existing in the hothouse. Such corrosion may cause the temperature adjustor 15 to malfunction.

Typically, most agricultural chemicals are kept in a liquid state. However, a powdered agricultural chemical such as sulfur may be liquidized by heating, or solidified and expanded if it gets cold. Accordingly, if the powdered agricultural chemical gets cold, it may expand the flat bottom surface of the storage tank 9, causing the bottom surface of the storage tank 9 to droop downwards, and reduce the heat transfer area of the heating element 13.

Further, since the inside diameter of the upper portion of the storage tank 9 and the lower portion thereof are designed to be the same, it is difficult to fit the storage tank 9 into the protective barrel 11, causing the heat produced from the heating element 13 to easily exhaust through the gap formed between the storage tank 9 and the protective barrel 11.

SUMMARY OF THE INVENTION

It is an object of the present invention to provide a fumigation type control device for scattering agricultural chemicals while maintaining a desired proper temperature.

It is another object of the present invention to provide a fumigation type control device for scattering agricultural chemicals which heats and fumigates the agricultural chemicals at a desired proper temperature without using a separate temperature adjustor.

It is still another object of the present invention to provide a fumigation type control device for scattering agricultural chemicals wherein a storage tank for storing and heating the agricultural chemicals is not deformed even if a powdered agricultural chemical is used.

It is still another object of the present invention to provide a fumigation type control device for scattering agricultural chemicals which prevents the heat generated from heating elements from leaking outside.

In order to achieve the above objects, the fumigation type control device for scattering agricultural chemicals according to the present invention includes a first heating element and a second element which are connected in series to each other and fixed to a heating plate. On the upper portion of the heating plate is provided a storage tank for storing the agricultural chemicals.

The first heating element comprises a nichrome wire or a sheath heater which has a predetermined resistance value and generates heat when the power is supplied.

The second heating element comprises a PTC (positive temperature coefficient) heater having a resistance which increases in accordance with an increase of its temperature.

According to the present invention, when the power is supplied, the first and second heating elements generate heat as the current flowing therethrough is limited by the first heating element, and then the resistance value of the second heating element increases over that of the first heating element as the second heating element is heated by the heat generated from the first and second heating elements.

In the event that the heating temperature of the agricultural chemicals varies due to the variation of the environmental temperature or the supply voltage, of the generation of the heat loss, the resistance value of the second heating element varies to limit the current flowing therethrough, so that the temperature is kept uniform.

Also, according to the present invention, the storage tank has a convex portion formed on the center portion of the bottom surface thereof to prevent deformation of the bottom surface, and the inside diameter of the lower portion of the storage tank is smaller than that of the upper portion thereof for easy fitting of the storage tank into a main body, thereby preventing the heat generated from the heating elements from leaking outside.

BRIEF DESCRIPTION OF THE DRAWINGS

The above objects, other features and advantages of the present invention will become more apparent by describing the preferred embodiments thereof with reference to the accompanying drawings, in which.

DETAILED DESCRIPTION OF THE PREFERRED EMBODIMENTS

Figure 1:
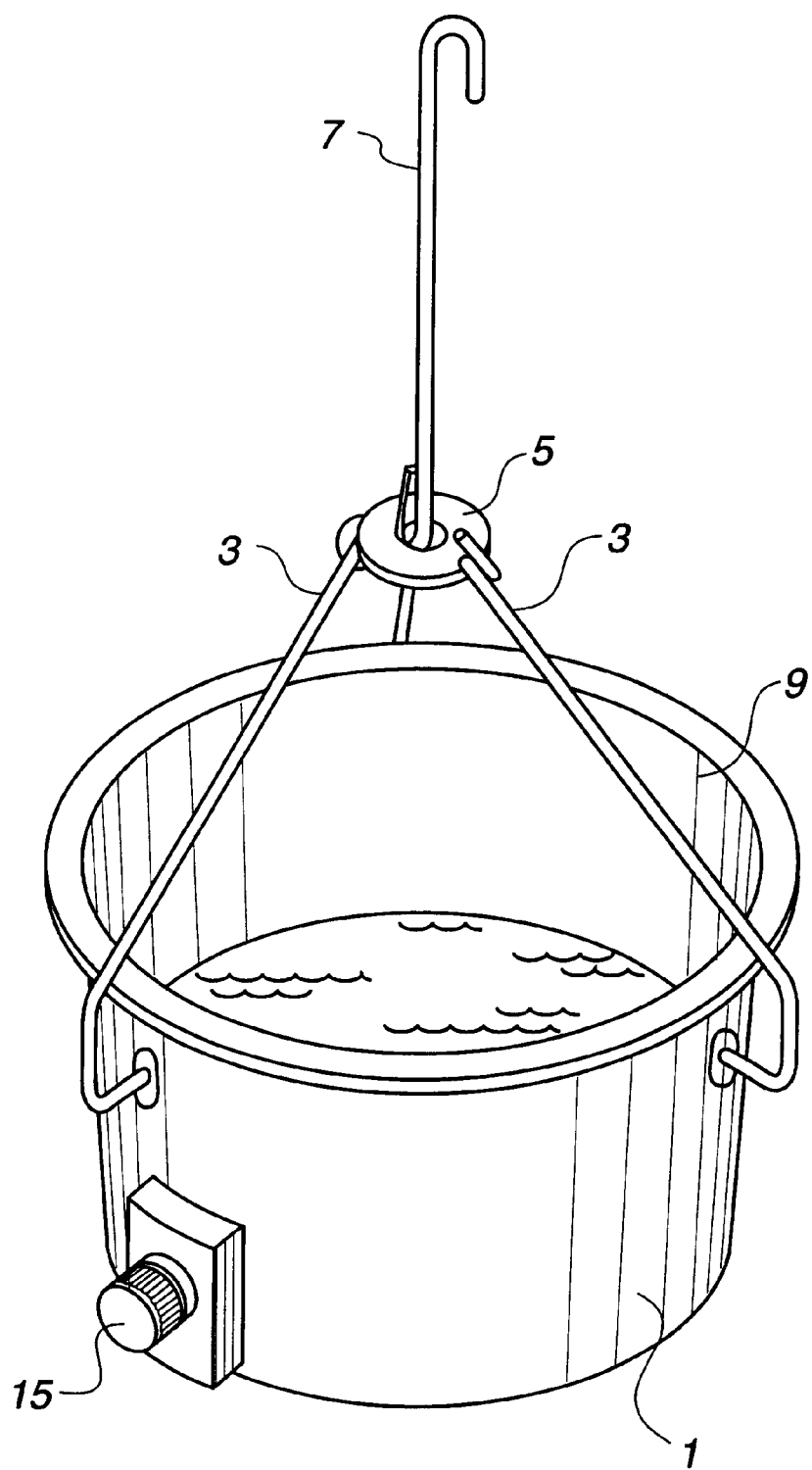
FIGS. 1 and 2 are a perspective view and a partial section view of a conventional fumigation type control device for scattering agricultural chemicals, respectively.
Figure 2:
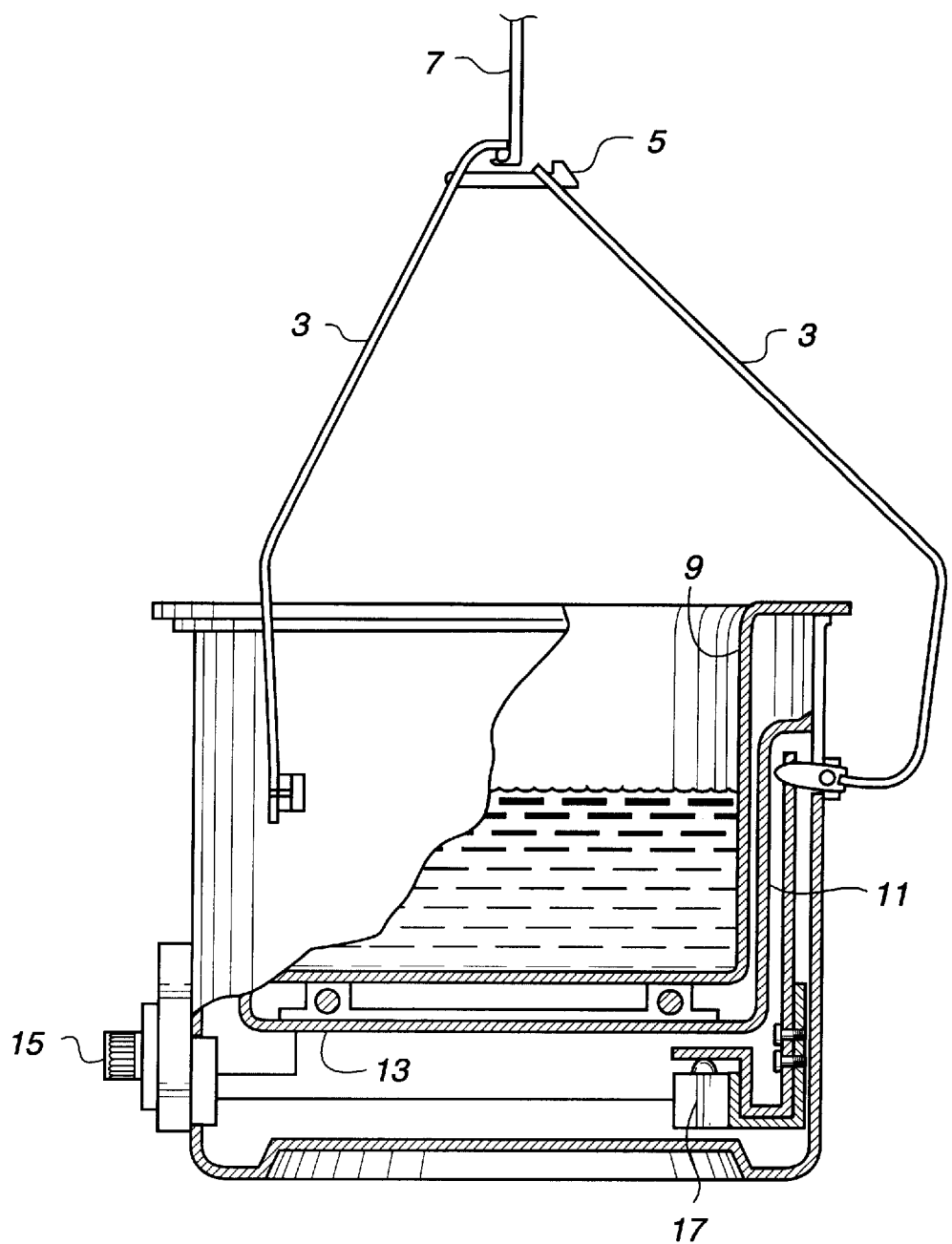
Figure 3:
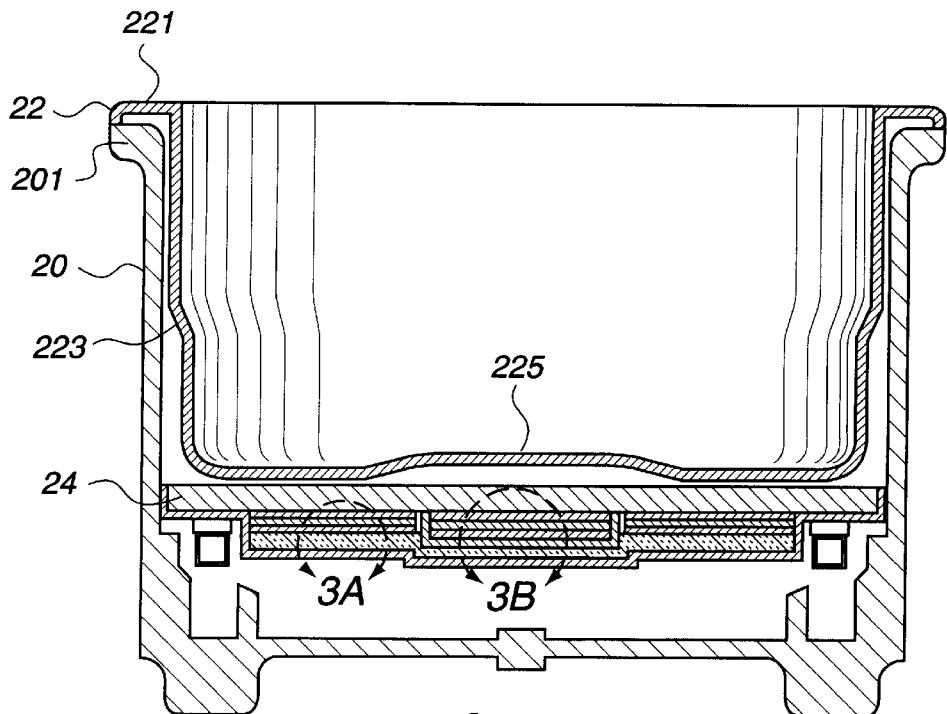
FIGS. 3, 3A and 3B are sectional views of the fumigation type control device for scattering agricultural chemicals according to one embodiment of the present invention.
Figure 3A:
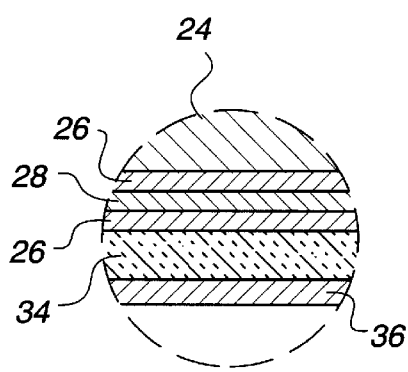
Figure 3B:
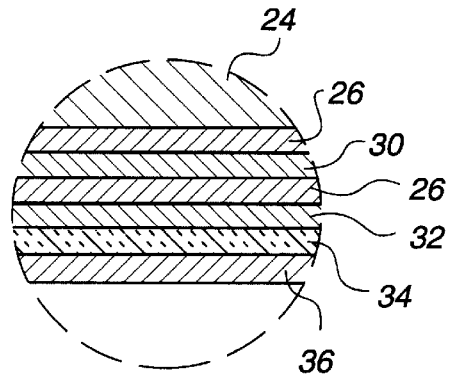
Figure 4:
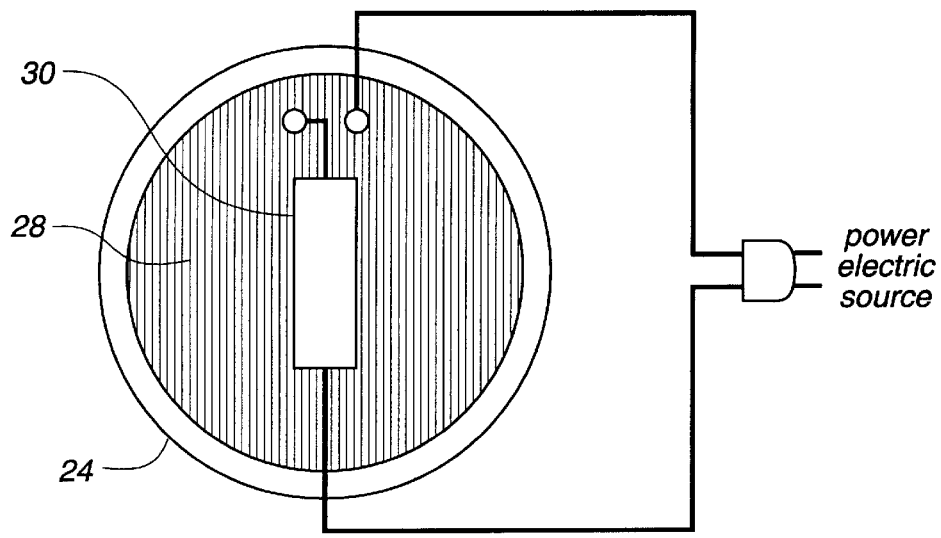
FIG. 4 is a schematic plan view of the heating plate and the heating elements of the control device of FIG. 3.

Referring to the figures, FIGS. 3, 3A and 3B are sectional views illustrating one embodiment of a fumigator type control device for scattering agricultural chemicals according to the present invention, and FIG. 4 is a plan view illustrating one embodiment of the heated plate and the heating elements of the control device according to the present invention. Referring to FIGS. 3, 3A, 3B, 4 and 5, the illustrated embodiment of the control device includes a storage tank 22, provided in a main body 20, for storing agricultural chemicals to be fumigated, the upper portion of which is opened. An upper edge portion 20 of a main body 20 can be substantially covered by an outwardly bent upper edge portion 221 of the storage tank 22, and the storage tank 22 has a bent portion 223 formed along the middle periphery thereof so that the upper diameter of the storage tank 22 is larger than that of the lower diameter thereof. Further, on the center portion of the bottom surface of the storage tank 22 is provided a convex portion 225 protruded upwardly from the bottom surface.

A heated plate 24 is provided under the bottom of the storage tank 22 to heat the storage tank for storing the agricultural chemicals to be fumigated. The heated plate 24 has the shape of a circle substantially similar to the bottom surface of the storage tank 20.

Also, first and second heating elements 28 and 30 are attached to the bottom surface of the heated plate 24, and an insulating layer 26 such as mica is interposed between the first and second heating elements 28 and 30 and the heated plate 24 for the electrical insulation.

The first heating element 28 preferably comprises a nichrome wire which has a constant resistance value regardless of its temperature variation and which is preferably arranged in the shape of a circle to uniformly heat the heated plate 24. The second heating element 30 comprises a PCT (positive temperature coefficient) heater, the resistance of which increases in accordance with the increase of its temperature, and is positioned on the center of the plate 24. The first and second heating elements 28 and 30 are connected in series to each other so that the initial excessive starting current flowing therethrough is limited by the resistance value of the first heating element 28.

Reference numeral 32 indicates a fixture for fixing the second heating element 30. Reference numeral 34 indicates a thermal insulation material for insulating the downward transfer of the heat produced from the first and second heating elements 28 and 30. Reference numeral 36 indicates a fixing bracket.

In using the fumigation type control device according to the present invention as constructed above, the storage tank 22 is first fitted into the main body 20. Since the lower diameter of the storage tank 22 is smaller than the upper diameter thereof by the bent portion 223 formed on the middle periphery thereof, the storage tank 22 will be easily inserted within the main body 20.

Thereafter, if the storage tank 20 is filled with the agricultural chemicals, and the commercial AC power is supplied to the control device, the first and second heating elements 28 and 30 generate heat by the supply of the AC power. At this time, the first heating element 28 has a constant resistance value regardless of its temperature variation, and the second heating element 30 has a resistance value which increases in accordance with the increase of its temperature.

At the initial power-on stage, the initial temperature of the first and second heating elements 28 and 30 is normal, and the resistance value of the first heating element 28 is higher than that of the second heating element 30. Thus, the current flows through the heating elements is limited and controlled by the high resistance value of the first heating element 28, causing the first heating element 28 (having the high resistance value) to produce a relatively large quantity of heat and the second heating element 30 (having the low resistance value) to produce a relatively small quantity of heat. The plate 24 is heated by the heat produced from the first and second heating elements 28 and 30 which, in turn, heat the agricultural chemicals are heated by the heated plate 24 to be fumigated and scattered onto the crops.

As the second heating element 30 is heated as above, the resistance value thereof increases and becomes higher than that of the first heating element 28. As a result, since the quantity of heat produced from the second heating element 30 is higher than that of the first heating element 28, the temperature of the heated plate 24 is determined mainly by the quantity of heat produced from the second heating element 30.

Figure 5:
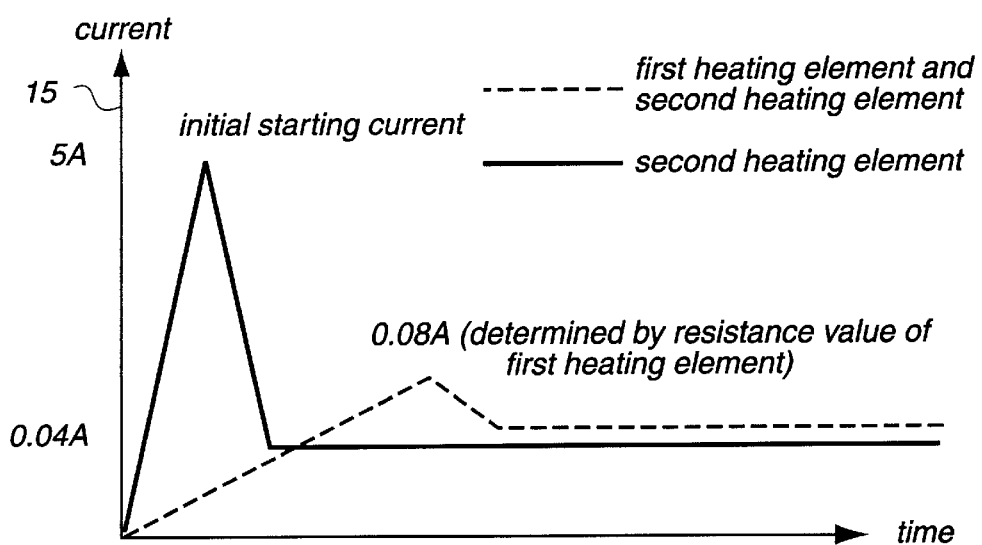
FIG. 5 is a graph illustrating the characteristic of the current flowing through the second heating element used in the control device of FIG. 3.

The second heating element 30, i.e., the PTC heater, has advantages in that it can produce a large quantity of heat with its small size, maintain a controlled heating temperature at its inherently determined value, and quickly reaches a desired temperature. However, at the initial stage where the power is supplied to the PTC heater, it requires a relatively high starting current as shown in FIG. 5.

According to one objective of the present invention, the first heating element 28 which is a nichrome wire and the second heating element 30 are connected in series to each other so as to prevent the relatively high starting current from flowing therethrough at the initial power-on stage.

For instance, if it is assumed that the resistance value of the first heating element 28, i.e., the nichrome wire, is 460 W, the resistance value of the second heating element 30, i.e., the PTC heater, is 80 W at the normal temperature, and the supply voltage E is 220V, the current I, flowing through the first and second heating elements 28 and 30 at the initial power-on stage is given by $$I1=E/(R1+R2)=220V/(460W+80W)=0.407[A] \quad \text{(Equation 1)}$$

In cases where only the second heating element 30 is used, the current I2 flowing therethrough at the initial power-on stage is given by $$I2=E/R2=220V/80W=2.75[A] \quad \text{(Equation 2)}$$

Thus, according to the present invention, the relatively high starting current may be minimized at the initial power-on stage by using the first and second heating elements 28 and 30 connected in series to each other.

If the heating temperature continuously increases and reaches, for instance, about 200° C. as the first and second heating elements 28 and 30 generate heat, the temperature of the second heating element 30 also increases to about 200° C.

Here, if it is assumed that the resistance value of the second heating element 30 becomes 800 W when the temperature thereof reaches about 200° C., the current I2 flowing through the first and second heating elements 28 and 30 is given by $$I2=E/(R1+R2)=200V/(460W+800W)=0.1746[A] \quad \text{(Equation 3)}$$

The terminal voltage V1 of the first heating element 28 and the terminal voltage V2 of the second heating element 30 are given by $$V1=460\times0.1764=80.3V$$

$$V2=800\times0.1764=139.7V \quad \text{(Equation 4)}$$

As can be seen from equation 4, the voltage V1 of the first heating element 28 is higher than the voltage V2 of the second heating element 30, and thus the quantity of heat generated from the first heating element 28 becomes greater than that generated from the second heating element 30.

Accordingly, if the temperature of the second heating element 30 exceeds a predetermined temperature, the fumigating temperature of the agricultural chemicals is mainly affected by the quantity of heat generated from the second heating element 30.

Meanwhile, if the heating temperature of the agricultural chemicals varies due to variations of the environmental temperature, the variation of the supply voltage, and heat loss, the resistance value of the second heating element 30 also varies. Thus, the current flowing through the second heating element 30 is adjusted in response to the variation of the resistance value of the second heating element 30, so that that the agricultural chemicals are fumigated at a uniform temperature.

According to the present invention, a bent portion 223 is formed along the periphery of the storage tank 22, and the upper edge portion 210 of the storage tank 22 is bent outwardly so that it completely covers the upper edge portion 201 of the main body 20. By this structure, the heat produced from the heating plate 24 which is heated by the first and second heating elements 28 and 30 does not leak outside, but remains between the main body 20 and the storage tank 22 to heat the agricultural chemicals contained in the storage tank 22.

Figure 6:
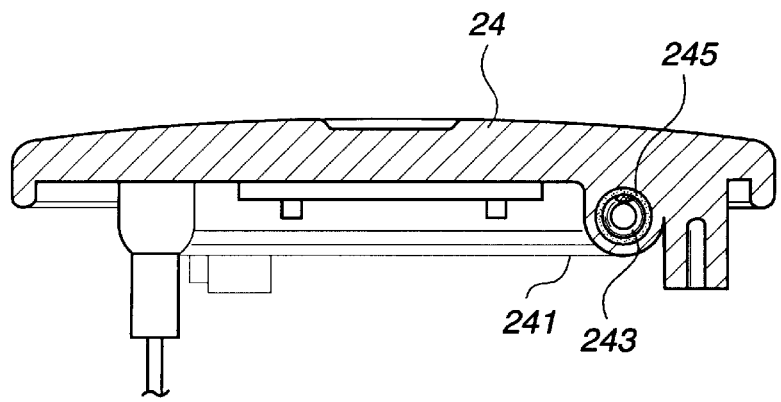
FIGS. 6 and 7 are a sectional view and a partially sectioned bottom view of the sheath heating element used in the control device of FIG. 3 according to another embodiment of the present invention.
Figure 7:
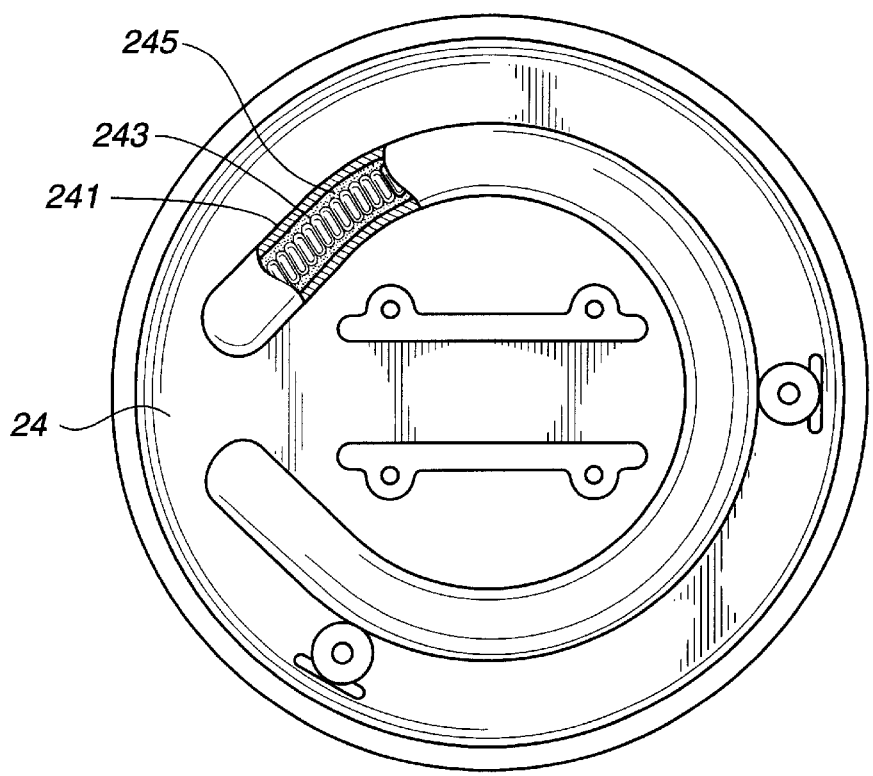

In the illustrated embodiment, the first heating element 28 comprises a nichrome wire which is connected in series to the second heating element 30 to limit the initial starting current flowing therethrough. However, the present invention is not limited to the above-described embodiment. Specifically, various heating materials which have constant resistance values regardless of the temperature variation may be used as the first heating element 28. For instance, as shown in FIGS. 6 and 7, a cylindrical tube 24 may be formed on the bottom on the heating plate 24, and a sheath heater, which is provided by inserting in the tube 241 a nichrome wire 243 and heat-resisting inorganic insulating powder 245, may be used as the first heating element 28.

Figure 8:
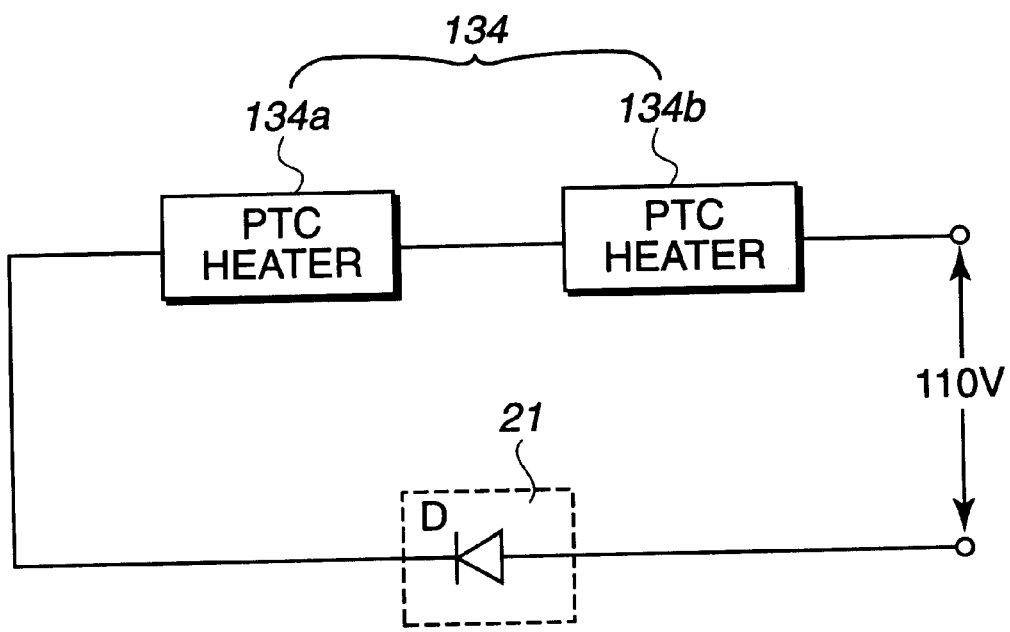
FIG. 8 is a schematic diagram showing a heating means in yet another embodiment of the present invention.
Figure 9:
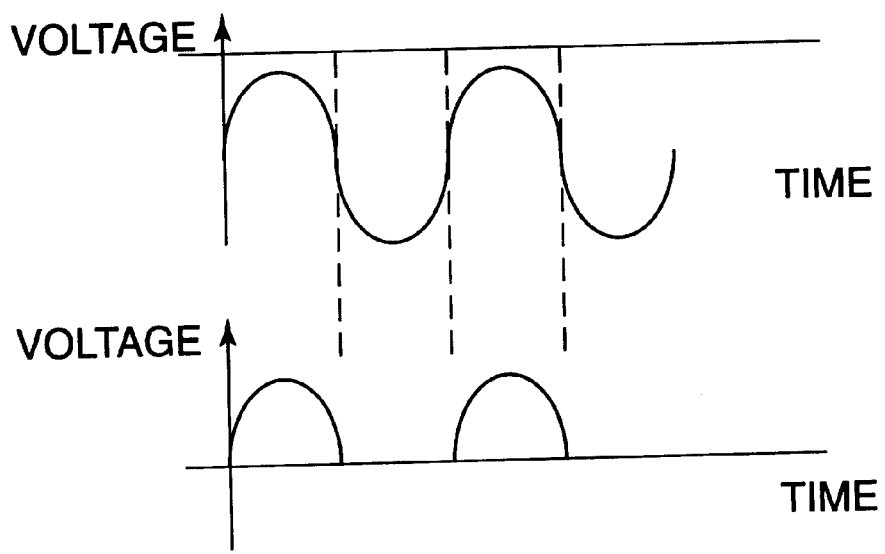
FIG. 9 is a waveform diagram illustrating an operation of each element of the heating means shown in FIG. 8.

In the embodiment shown in FIG. 8, the control device includes a heating means 134 such as a plurality of PTC heating elements 134a and 134b, respectively, and a rectifier 21 electrically connected in series. The rectifier 21 may be capable of supplying a half-wave AC voltage to the heating means 134. FIG. 9 shows the wave form diagram illustrating the operation of each element of the heating means shown in FIG. 8. The top waveform in FIG. 9 is a typical waveform for a 110 AC power source. The bottom waveform in FIG. 9 is the half-wave AC voltage generated after rectification by the diode 21. It is preferred that the PTC heaters 134a, 134b and the rectifier 21 are electrically connected with stainless steel wires by spot welding.

As described above, according to the present invention, an excessive starting current is prevented from flowing through the first heating element which has a constant resistance value regardless of the temperature variation at an initial power-on stage. Thus, a plurality of control devices can be installed in a hothouse and can be simultaneously operated. Also, if the heating temperature exceeds a predetermined temperature, the agricultural chemicals are heated and fumigated mainly through the second heating element, the resistance of which varies in accordance with its temperature, resulting in that the agricultural chemicals can be heated and fumigated with a uniform temperature regardless of the variation of the environmental temperature or the supply voltage, or the generation of the heat loss.

While the present invention has been described and illustrated herein with reference to the preferred embodiments thereof, it will be understood by those skilled in the art that various changes in form and details may be made therein without departing from the spirit and scope of the invention.

What is claimed is:

1. A fumigation type control device for scattering agricultural chemicals comprising:

a first heating element having a constant resistance value regardless of variation of its temperature and generating heat in response to a current flowing therethrough at an initial power-on stage;

a second hearing element for generating heat connected in series to said first heating element, and having a resistance value increasing in accordance with its temperature, wherein the first heating element has a higher resistance than that of the second heating element at a normal temperature to reduce at least by one-half the current flowing therethrough at the initial power-on stage in comparison to current flowing without the first heating element;

a storage tank for storing therein said agricultural chemicals to be fumigated and heating said stored agricultural chemicals by heat generated from said first and second heating elements; and a heated plate provided under the bottom of the storage tank to heat the storage tank, wherein said first and second heating elements are in continuous heat communication with the bottom surface of the heated plate so that the plate is heated by the heat produced from the first and second heating elements and the second heating element is heated by the first heating element.

2. A fumigation type control device as claimed in claim 1 wherein said second heating element is positioned in a center of said storage tank, and said first heating element is positioned around said second heating element.

3. A fumigation type control device as claimed in claim 1 wherein said first heating element is a nichrome wire, and said second heating element is a positive temperature coefficient heater.

4. A fumigation type control device as claimed in claim 1 wherein said first heating element is a sheath heater, and said second heating element is a positive temperature coefficient heater.

5. A fumigation type control device as claimed in claim 1 wherein said resistance value of said second heating element is smaller than that of said first heating element at a normal temperature, and is greater than that of said first heating element if its temperature exceeds a predetermined temperature.

6. A fumigation type control device as claimed in claim 1 wherein said first and second heating elements include an insulating layer for electrical insulation thereof.

7. A fumigation type control device as claimed in claim 1 wherein said storage tank has a convex portion formed on a bottom surface of said storage tank.

8. A fumigation type control device as claimed in claim 1 wherein said storage tank has a bent portion formed along a middle periphery of said storage tank so that an upper inside diameter of said storage tank is greater than a lower inside diameter thereof.

9. A fumigation type control device for scattering agricultural chemicals, comprising:

a heating means;

a storage tank for storing therein said agricultural chemicals to be fumigated and heating said stored agricultural chemicals by heat generated from said heating means; and a heated plate provided under the bottom of the storage tank to heat the storage tank, wherein said heating means comprises a plurality of positive temperature coefficient heaters electrically connected in series and a rectifier for half-wave rectifying electric power inputted from an external power source to thereafter supply it to the PTC heaters.

10. The device as defined in claim 9, wherein said positive temperature coefficient heaters and the rectifiers are electrically connected with stainless steel wires by spot welding.

11. The fumigation type control device as claimed in claim 9, wherein a first positive temperature coefficient heater is positioned in a center of said storage tank.

12. The fumigation type control device as claimed in claim 9 wherein said storage tank has a convex portion formed on a bottom surface of said storage tank.

13. The fumigation type control device as claimed in claim 9 wherein said storage tank has a bent portion formed along a middle periphery of said storage tank so that an upper inside diameter of said storage tank is greater than a lower inside diameter thereof.

14. A fumigation type control device for scattering agricultural chemicals comprising:

a first PTC heating element having a first resistance value increasing in accordance with temperature;

a second PTC heating element connected in series to the first PTC heating element, and having a second resistance value increasing in accordance with temperature;

a storage tank for strong therein the agricultural chemicals to be fumigated and heating the stored agricultural chemicals by heat generated from the first and second PTC heating elements; and a heated plate provided under the bottom of the storage tank to heat the storage tank, wherein said first and second PTC heating elements are in continuous heat communication with the bottom surface of the heated plate.

15. The fumigation type control device of claim 14, further comprising a rectifier connected between an external power source and the first PTC heating element for half-wave rectifying electric power inputted from the external power source.

16. The fumigation type control device of claim 14 wherein said storage tank has a convex portion formed on a bottom surface of said storage tank.

17. The fumigation type control device of claim 14 wherein said storage tank has a bent portion formed along a middle periphery of said storage tank so that an upper inside diameter of said storage tank is greater than a lower inside diameter thereof.

* * * * *